United States Patent [19]

Zhang et al.

[11] Patent Number: 5,712,461
[45] Date of Patent: Jan. 27, 1998

[54] MOLECULAR SIEVE—PHOTOACTIVE SEMICONDUCTOR MEMBRANES AND REACTIONS EMPLOYING THE MEMBRANES

[75] Inventors: Zhenyu Zhang, Bronx, N.Y.; James R. Fehlner, Salem Township, Wayne County, Pa.

[73] Assignee: Inrad, Northvale, N.J.

[21] Appl. No.: 559,226

[22] Filed: Nov. 17, 1995

Related U.S. Application Data

[62] Division of Ser. No. 921,786, Jul. 30, 1992, Pat. No. 5,468,699.

[51] Int. Cl.$^6$ .............................. C07C 1/00; B01J 37/34; B01J 29/04
[52] U.S. Cl. .............................. 204/157.15; 204/157.4; 204/157.46; 204/157.47; 204/157.52; 204/295; 502/5; 502/60
[58] Field of Search .......................... 204/157.15, 157.4, 204/157.46, 157.47, 157.52, 295; 502/4, 5, 60

[56] References Cited

U.S. PATENT DOCUMENTS

| | | | |
|---|---|---|---|
| 4,699,892 | 10/1987 | Suzuki | 502/4 |
| 4,853,202 | 8/1989 | Kuznicki | 423/326 |
| 4,892,712 | 1/1990 | Robertson et al. | 422/186 |
| 4,955,208 | 9/1990 | Kawashima et al. | 62/264 |
| 4,962,075 | 10/1990 | Green et al. | 502/71 |
| 5,006,248 | 4/1991 | Anderson et al. | 210/500.25 |
| 5,019,263 | 5/1991 | Haag et al. | 210/500.25 |
| 5,032,241 | 7/1991 | Robertson et al. | 204/157.15 |
| 5,047,378 | 9/1991 | Kato et al. | 502/74 |
| 5,120,692 | 6/1992 | Beck | 502/60 |
| 5,258,339 | 11/1993 | Ma et al. | 502/4 |

FOREIGN PATENT DOCUMENTS

| | | |
|---|---|---|
| 0 228 885 | 7/1987 | European Pat. Off. . |
| 57-01135842 | 5/1982 | Japan . |
| 63-63126560 | 5/1988 | Japan . |
| 03228639 | 10/1991 | Japan . |
| 2108402 | 10/1981 | United Kingdom . |
| 89/00983 | 2/1989 | WIPO . |
| 89/00985 | 2/1989 | WIPO . |
| 89/08079 | 9/1989 | WIPO . |

OTHER PUBLICATIONS

Landolt, G.R., "Method for Rapid Determination of Adsorption Properties of Molecular Sieves", *Analytical Chemistry*, vol. 43, No. 4, Apr., 1971, pp. 613–615.

Reiche, H., et al., "Heterogenous Photosynthetic Production of Amino Acids from Methan–Ammonia–Water at Pt/TiO$_2$ Implications in Chemical Evolution", *J. of the American Chemical Society*, 101:11, May, 1979, pp. 3127–3128.

Sabate, J., et al., "A Kinetic Study of the Photocatalytic Degradationof 3–Chlorosalicyclic Acid over TiO$_2$ Membranes Supported on Glass", *Journal of Catalysis*, 127, 1991, pp. 167–177.

Pelizzetti, E., "Photocatalytic Reactions of Organic Compounds. Hydrogen Generation From Organic and Degradation of Wastes", *Photoelectrochemistry, Photocatalysis and Photoreactors*, 1985, pp. 305–319.

Matthews, R.W., "Solar–Electric Water Purification Using Photocatalytic Oxidation with Titanium Oxide as a Stationary Phase", *Solar Energy*, 38:6 (1987) pp. 405–413.

Pruden, A.L., "Photoassisted Heterogenous Catalysis: The Degradation of Trichlorethylene in Water", *Journal of Catalysis*, 82, 1983, 404–417.

Schrauzer, G.N., et al. "Photolysis of Water and Photoreduction of Nitrogen on Titanium Dioxide", *Journal of the American Chemical Society*, 99:22, Oct. 26, 1977, pp. 7189–7193.

Ollis, D.F., et al., "Hetrogeneous Photoassisted Catalysis: Conversions of Perchloroethylene, Dichloroethane, Chloroacetic Acids and Chlorobenzenes", *Journal of Catalysis*, 88, 1984, pp. 89–96.

JAPIO abstract of JP 63126560 (Takeshi et al.), May 30, 1980.

JAPIO abstract of JP 01135842 (Teruaki et al.), May 29, 1989.

WPIDS abstract of JP 01135842 (Teruaki et al.), May 29, 1989.

JAPIO abstract of JP 63182036 (Hiroshi et al.), Jul. 27, 1988.

JAPIO abstract of JP 03228639 (Kenichi et al.) Oct. 9, 1991.

*Primary Examiner*—Kathryn L. Gorgos
*Assistant Examiner*—Alex Noguerola
*Attorney, Agent, or Firm*—Stroock & Stroock & Lavan LLP

[57] ABSTRACT

Methods for forming membranes of semiconductive material incorporating molecular sieve material therein can involve sol gel techniques and suction techniques. The semiconductors, such as metal oxides, sulfides or carbides have photoactivity and are useful in photocatalytic reactions. An example of such a membrane is titanium oxide including zeolite molecular sieve incorporated therein. The membranes can be used to perform useful chemical reactions such as the mineralization of organic chemicals in the presence of light. For example, many toxic organic chemicals can be converted to useful or benign products by contacting those chemicals with active metal oxide-molecular sieve membranes in accordance with the invention and illuminating the membranes with light of a suitable wavelength.

18 Claims, No Drawings

MOLECULAR SIEVE— PHOTOACTIVE SEMICONDUCTOR MEMBRANES AND REACTIONS EMPLOYING THE MEMBRANES

This is a divisional application of application Ser. No. 07/921,786, filed on Jul. 30, 1992, which issued as U.S. Pat. No. 5,468,699 on Nov. 21, 1995.

BACKGROUND OF THE INVENTION

This invention relates generally to inorganic membranes. Such membranes are particularly well suited for conducting chemical reactions including the mineralization of certain organic chemicals, the separation of mixtures and the treatment of municipal and industrial waste.

The use of membranes to separate mixtures and catalyze chemical reactions is becoming an important chemical technique. Membrane separations tend to require less energy than competing techniques such as distillations. Furthermore, the use of membranes in chemical processes can be less costly and more simple to implement than other techniques.

Many techniques have been employed to form inorganic membranes. Examples of these include laser drilling, slip casting, track etching, anodic oxidation and the use of sol gel technology. Sol gels are formed through the acid or basic catalysis of the hydrolysis of metal or semi-metal alkoxides. The gel can be dried and fired to yield amorphous and ceramic-type membrane materials. The use of sol gel technology to prepare titania ceramic membranes is described in PCT Patent No. WO 8900983 and WO 8900985, the contents of which are incorporated herein by reference.

Molecular sieve material has been used to effect separations and to catalyze chemical reactions. Molecular sieves are a class of materials which contain pores and/or cages with a size similar to that of many organic molecules. Accordingly, molecular sieves can differentiate and separate organic molecules based on the size of the molecules.

Semiconductor particles including metal oxides, sulfides and carbides have been used to catalyze many important reactions. These semiconductor materials have photoactivity and are well suited as catalysts in photochemical reactions. However, these reactions are typically conducted in a liquid suspension of the semiconductor particles.

Municipal and industrial waste management has become one of the most serious and urgent problems facing modern society. The most commonly employed solutions involve either land disposal or burning of organic waste material in either open air or closed system incinerators. However, these methods are becoming disfavored because of the limited availability of landfill sites and the high energy costs associated with incineration as well as the problem of dealing with the gases and solid incineration by-products.

Accordingly, it is desirable to produce improved membranes for carrying out important industrial processes. For example, it would be particularly desirable to develop membranes for treating municipal and industrial waste.

SUMMARY OF THE INVENTION

Generally speaking, in accordance with the invention, methods are provided for forming membranes of semiconductive materials incorporating molecular sieve materials, such as zeolites, therein. The semiconductors, such as metal oxides, sulfides or carbides are photoactive and are useful in photocatalytic reactions. Methods for forming the membranes can involve sol gel techniques and surface reaction techniques. An example of such a membrane is titanium oxide including a zeolite molecular sieve incorporated therein.

Membranes in accordance with the invention can be used to perform useful chemical reactions such as the mineralization of organic chemicals in the presence of light. For example, many toxic organic chemicals can be converted to useful or benign products by contacting those chemicals with active metal oxide-molecular sieve membranes in accordance with the invention and illuminating the membranes with light of a suitable wavelength.

Accordingly, it is an object of the invention to provide an improved inorganic membrane.

Another object of the invention is to provide an improved method of forming a membrane including both metal oxide and molecular sieve material.

A further object of the invention is to provide an improved method of mineralizing toxic organic chemicals.

Yet another object of the invention is to increase the photoefficiency of conventional membranes.

Still other objects and advantages of the invention will in part be obvious and will in part be apparent from the specification.

The invention accordingly comprises the several steps and the relation of one or more of such steps with respect to each of the others and the membrane possessing the features, properties and the relation of constituents which are exemplified in the following detailed disclosure and the scope of the invention will be indicated in the claims.

DETAILED DESCRIPTION OF THE PREFERRED EMBODIMENTS

Membranes in accordance with the invention can include active metal oxides, metal sulfides and carbides that are photoactive together with a molecular sieve material. Many of these semiconductive particles have found important uses in catalyzing chemical reactions. Semiconductors are useful in conducting photochemical reactions. Molecular sieves are useful both for conducting separations and as catalysts. It has been determined that extremely useful membranes can be formed by combining semiconductor material and molecular sieves in a single membrane in intimate contact so that both materials can enhance the effectiveness of the other.

Molecular sieves are a class of materials that have pores and/or chambers that are similar in size to many organic molecules. Accordingly, they can selectively adsorb molecules based on the size and shape of the molecules. Zeolites are one family of molecular sieves. Zeolites are crystalline materials that contain silicon oxides and aluminum oxides formed with a three dimensional structure in which tetrahedra of primarily $SiO_4$ and $AlO_4$ are crosslinked by sharing oxygen atoms, whereby the ratio of Si to O atoms can be about 1:2. Depending on the manner of bonding, the crystal structures can have various ring sizes containing 8, 10, 12 or more metal/semi-metal atoms. This ring structure leads to a crystal structure with pores and chambers that are of a molecular size.

The zeolite can have the general formula:

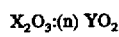

$$X_2O_3:(n) YO_2$$

where X is a trivalent element such as Al, B, Fe, Ga and combinations thereof; Y is a tetravalent element such as Si, Ge, Ti and combinations thereof; and n is at least 2.

The semiconductor portion of the membrane can include a photoactive polymeric metal/semimetal oxide matrix and a molecular sieve can be impregnated in the matrix. Suitable metal oxides include $TiO_2$, $WO_3$, $ZnO$, $CdO$, $Fe_2O_3$ and $SrTiO_3$. Certain sulfides are also suitable, including CdS and ZnS. Carbides such as SiC can also act as photocatalysts.

Titanium oxide ($TiO_2$) or titania can be an important component of a membrane in accordance with the invention. $TiO_2$ can also be combined with $SiO_2$. Titania can be used for a variety of processes and purposes. In addition to separations, titania can also be used in various catalytic applications. Because titania is a semiconductor, it can catalyze many chemical reactions upon proper irradiation. Furthermore, catalytic applications using the titania in the membrane form will offer advantages over conventional slurry suspensions of titania. For example, the costly filtration, resuspension and recirculation steps associated with conventional titania slurry systems are eliminated when the desired reaction is catalyzed with a titania membrane. Membranes including titania can also be used as an efficient adsorbent or filter in addition to being the catalyst for a chemical reaction.

A photocatalyst of $TiO_2$ is useful in many important chemical reactions. For example, $TiO_2$ catalyzes the conversion of $CH_4$ and $NH_3$ to amino acids in water. H. Reiche, A. J. Bard, *J. Am. Chem. Soc.* (101) 3137 (1979). Photocatalytic conversion of nitrogen and water to ammonia can be carried out on iron doped $TiO_2$. G. N. Schrauzer, T. D. Guth, *J. Am. Chem. Soc.* (99) 7189 (1977). The contents of these two articles are incorporated herein by reference. $TiO_2$ is also used in the photo-assisted water—gas shift reaction, i.e., the reaction of carbon monoxide and water to yield carbon dioxide and hydrogen gas.

$TiO_2$ can also be important in artificial photosynthesis to yield hydrogen fuel from photocatalytic decomposition of water or biomass. Hydrocarbons can also be converted to oxygen-containing compounds in the presence of $TiO_2$ photocatalysts. However, under conventional methods and with conventional forms of materials, these $TiO_2$ photocatalyzed reactions have exhibited a rather low quantum yield of less than about 2%. This low quantum yield is not fully satisfactory and has been a major limitation in the commercial application of $TiO_2$ photocatalysis.

Titania particles will be extremely useful in organic waste management. For example, many toxic chemicals in waste streams can be mineralized or otherwise rendered benign when illuminated with near-ultraviolet light or simulated sunlight in the presence of semiconductor particles such as titania. Titania can be photoactivated, it is chemically stable and it is relatively inexpensive. Furthermore, it is a constituent of many natural clays and is therefore environmentally friendly.

Light absorption at a semiconductor surface is analogous to the adsorption of photons by an atom or molecule. Electron excitations occur when the incident light energy equals or exceeds the energy difference between the valence band and the conduction band. This leads to the generation of free electrons and electron holes (vacancies). The photogenerated holes at the surface of the semiconductor material are available for use in oxidation reactions and the photogenerated electrons can be used in reduction reactions.

A photoredox reaction at a semiconductor interface can involve reactive hydroxyl radicals. It has been proposed that the mechanism of generation of hydroxyl radicals is through the oxidation of $H_2O$ or $OH^-$ by the holes. Hydroxyl radicals react with organic molecules adsorbed on the semiconductor surface or dissolved in the solution to yield the products. In addition to direct light absorption by $TiO_2$, metal ions and metal ion complexes can absorb light and sensitize the photoreactions.

It has been discovered that the quantum yield of $TiO_2$ photocatalyzed reactions can be markedly increased by combining the $TiO_2$ material with a molecular sieve in the form of a membrane. Preferable wavelengths of illuminating radiation are between 200 and 800 nm. The combination provides a synergistic effect in which the reaction yields of the combined materials exceed that for either material on its own on a same weight basis. Molecular sieves can selectively adsorb molecules based on the size and shape of the pores or chambers. If it is desired to selectively adsorb organic molecules from aqueous solutions, the molecular sieve should be both hydrophobic and organophilic. In zeolites this can be achieved by increasing the Si/Al ratio to a relatively high level. On the other hand, zeolites can also serve as ion exchangers. Providing zeolites with a high ion-exchange capacity is optimized by providing zeolites with relatively low Si/Al ratios.

Zeolites can be classified into small pore, medium pore and large pore families. The pore sizes range from about 3 Å to about 12 Å. Zeolites can also include chambers present in the zeolite framework with sizes up to about 13 Å. Thus, different types of zeolites are preferred for different purposes. For example, for the adsorption of organic molecules, medium and large pore zeolites with high Si/Al ratios, such as silicalite, mordenite and high silica NaY are preferred. For ion exchange purposes, zeolites with relatively low Si/Al ratios, such as NaA are preferred.

In general, metal oxide membranes containing molecular sieve material can be prepared with a process involving sol gel technology. First, molecular sieve particles are incorporated in a porous substrate. Then a metal alkoxide is hydrolyzed in water catalyzed with an acid solution. Peptization of the liquid results in the formation of a colloidal suspension referred to as a sol. As an example of the foregoing, a titanium alkoxide can be hydrolyzed in water, catalyzed with an acid solution and peptized with nitric acid to result in the sol. The sol is then allowed to pass through the porous substrate that includes molecular sieve and is incorporated therein to yield a substrate-sieve-sol combination. The sol in the substrate is then dried and sintered to form a molecular sieve-metal oxide membrane.

To incorporate zeolite particles in the supporting substrate of the membrane, the zeolite particles can be suspended in water and then drawn through a porous substrate with vacuum to trap the zeolite particles in the porous substrate. The sol can then be allowed to percolate through the zeolite impregnated porous substrate such as by osmotic pressure for example. The sol can then be evaporated to yield a semi-solid or gel. The semi-solid or gel can be sintered by firing at a high temperature to form a membrane including metal oxide and zeolite material.

There are five primary variables that should be controlled carefully to achieve the most desirable results. The first is the ratio of water to titanium. This ratio determines the concentration of titanium hydroxide formed in the hydrolysis which affects the gel-like properties of the material. The second variable is the ratio of acid catalyst to titanium which can affect the pH and the stability and polymer qualities of the gel. The third is the pH of the colloidal mixture which can also affect the polymer quality of the gel. The fourth variable is the sintering temperature which can affect the pore size of the membrane and crystal phase of the membrane. The fifth variable is the concentration of the zeolite particles in the suspensions which affects the percent loading of zeolite in the resulting membrane.

A preferred alkoxide starting material is titanium tetraisopropoxide Ti(OiPr)$_4$ and hydrochloric acid is a preferred catalyst for the hydrolysis. A suitable molar concentration for conducting the sol gel formation process is 1 Ti(OiPr)$_4$:100 H$_2$O:0.3 HCl. Acceptable ratios of titanium tetraisopropoxide to water are between 10 and 500, more preferably between 100 and 350. The ratio of H$^+$ to titanium tetraisopropoxide can be between 0.001 and 1, more preferably between 0.1 and 0.8. Although hydrochloric acid is a preferred inorganic acid, the reaction can typically be catalyzed with any organic or inorganic acid.

The titanium tetraisopropoxide should be added to the water with vigorous stirring and hydrolysis will proceed to result in a polymeric titanium hydroxide precipitate. The titanium hydroxide precipitate can then be peptized with the amount of nitric acid necessary to bring the pH of the sol below about 3 and the solution is heated to a temperature between 50° and 100° C., more preferably between 70° and 80° C. The solution can also be sonicated. This converts the precipitate into a highly dispersed and stable colloidal suspension.

The hydrolysis of titanium isopropoxide can also be carried out in an alcohol solution. The variables influencing the hydrolysis process in an alcohol solution include the order of mixing of reagents; the ratio of alcohol to titanium isopropoxide; the type of alcohol, such as isopropanol; and the ratio of H$_2$O to titanium isopropoxide. These variables affect the gel and polymer properties of the sol.

Titanium isopropoxide has four hydrolyzable alkoxy groups. Thus, the ratio of H$_2$O to titanium isopropoxide in alcohol-based hydrolysis should be in the range of 1:1 to 16:1, more preferably between 2:1 and 4:1. An acceptable molar composition for the alcohol-based procedure is 1 Ti(OiPr)$_4$:25 iPrOH:3.5 H$_2$O:0.08 HCl. The ratio of iPrOH to titanium isopropoxide should be at least 15:1, more preferably between 25:1 and 50:1. The ratio of H$^+$ to titanium isopropoxide is preferably from about 0.001:1 to 0.5:1, more preferably from 0.005:1 to 0.1:1.

It has been determined that the order of mixing has significant effects on the viability of the gels obtained. The titanium isopropoxide should first be diluted in anhydrous alcohol. The acid catalyst, HCl and H$_2$O are then diluted in the remaining alcohol. The HCl—H$_2$O alcohol solution should then be added to the titanium isopropoxide alcohol solution, with stirring, to provide an acceptable titania colloidal suspension.

A preferred method of loading the molecular sieve or zeolite particles on the membrane is to form a suspension of fine zeolite particles in water. The concentration of the particles in the suspension will determine the amount of zeolite material in the resulting membrane. A preferred substrate for the membrane is porous inert material, such as inorganic frits, including porous glass or quartz fritted filters or porous glass or quartz fiber filters as well as ceramic frits of various pore sizes. The zeolite suspension can be drawn through the porous substrate with suction and the amount of zeolite impregnated on the porous substrate will depend on the concentration of zeolite in the suspension, the average pore size of the porous substrate, the particle size of the zeolite material and the amount of flow of the suspension through the substrate.

The pore size of the porous substrate will affect the characteristics of the resulting membrane. Pore sizes varying between 1 and 250 microns can be acceptable and pore sizes of 2.5 to 50 microns are more preferred.

To combine titania material with the substrate, the titania colloidal suspension can be allowed to percolate through a zeolite impregnated-substrate with suction. The sol combined with the substrate is permitted to dry by evaporation and leave the substrate containing a gel. The substrate-zeolite-gel composite can then be fired under controlled heating to yield a zeolite-titania membrane. An acceptable heating rate is about 1° C. per minute and acceptable firing temperatures are between about 100° C. and 900° C., more preferably between 400° C. and 500° C.

In an alternative process for forming a zeolite-titania membrane, zeolite particles are suspended in the titania sol before it is combined with the substrate. The zeolite-titania sol is then drawn through the porous substrate to load the substrate with zeolite material and titania material at the same time. This method can be more efficient than when loading is performed as separate steps.

Another suitable method of incorporating both zeolite and titania material into the substrate is to use dip coating. For example, the zeolite particles are suspended in a titania sol and the porous substrate is dipped into the zeolite-sol solution. The substrate is then drawn out of the solution at a constant rate and permitted to dry. Thereafter, it can be fired to yield a zeolite-titania membrane.

Still another method of forming a membrane in accordance with the invention is the surface reaction method. For example, a zeolite-impregnated substrate can be exposed to titanium isopropoxide or another titanium alkoxide, in either the liquid or vapor state. The titanium alkoxide will react with silanols (SiOH) on the surface of the porous substrate and coat a film of titania on the surface of the substrate and promote adhesion to the support.

For a liquid phase reaction, the porous substrates are first treated with HCl or HF solution to produce surface silanols. Zeolite particles (which can be pretreated with acid if desired) are then impregnated in the substrate. The zeolite impregnated substrate is then put into neat titanium isopropoxide or titanium alcohol solution. Reaction with silanols takes place on the surface only because there is no water or acid catalyst in the neat liquid or in the alcohol solution. Zeolite-titania membranes are thereby formed on the substrate by a surface reaction.

Zeolite impregnated substrates can also be exposed to titanium isopropoxide vapor in a closed container. The vapor of titanium isopropoxide reacts with the surface silanols to yield a film of titania on the zeolite impregnated substrate to yield a zeolite-titania membrane. Systems treated in this manner can be treated subsequently with sols if desired. This combined approach can maximize the loading of the titania matrix to both the zeolite and substrate surface.

Membranes in accordance with the invention exhibit excellent adsorptive and ion exchange properties. Procedures for evaluating the adsorptive properties of certain materials are described in Landolt, G. *Analytic Chem.*, Vol. 43, p. 6–13 (1971) and the procedures therein can be used to test membranes in accordance with the invention. It was thereby determined that zeolite-titania membranes in accordance with the invention exhibit adsorptive capacities that are many times greater than those of titania membranes, for the same weight of material. Furthermore, when suspended in an aqueous solution of cations, membranes such as NaA-titania membranes exhibit significant ion exchange capacities.

Zeolite-titania membranes in accordance with the invention have been shown to be particularly effective for use in photocatalytic reactions. It is believed that the major deactivation pathway for photocatalysis on a zeolite-titania membrane is the rapid recombination of electrons and holes generated at the titania surface. The positively charged holes can be responsible for the destruction of organic contaminants. However, the photoefficiency of the photocatalyst can be increased if the recombination process can be slowed or if the electrons can be trapped. Thus, redox ions such as $Cu^{2+}$ ions doped on the membranes can serve as reduction centers to quench the free electrons. This increases the lifetime of the hole-electron pair and increases the photocatalytic efficiency of membranes including doped material.

To prepare a $Cu^{2+}$ doped membrane, a typical molar composition of starting material can be 1 $Ti(OiPr)_4$:100 $H_2O$:0.3 HCl. The weight ratio of $Cu^{2+}$ to the titanium dioxide formed in the hydrolysis can be in the range of 0.1% to 20%, more preferably in the range of from 1% to 10%. The resulting membranes will have photoefficiencies even higher than those of the nondoped zeolite-titania membranes.

Zeolite titania membranes in accordance with the invention can be used to catalyze many important chemical reactions. For example, they can mineralize toxic organic compounds into innocuous products. Chemicals such as trichloroethylene (TCE), chloroform and benzene can be mineralized to carbon dioxide, hydrochloric acid and water in the presence of membranes in accordance with the invention such as silicalite-titania membranes, $Cu^{2+}$ doped silicalite-titania membranes or ETS-10-titania membranes when the membranes are illuminated with appropriate wavelength electromagnetic radiation.

As noted above, the molecular sieve-titania membranes of the invention have a relatively high adsorptive capability, compared to conventional titania membranes. Thus, they can adsorb a wider range of organic molecules and can hold a larger number of molecules longer and more tightly. This increases the probability of reactive collisions between the active sites and the organic molecules or electron transfer through molecular sieve channels. The relatively long retention time of molecules on the membrane leads to an increase in the photoefficiency (quantum yield) of the membrane. Quantum yield can be defined as the moles of molecules converted per moles of photons adsorbed. Quantum yield can be calculated from the intensity of incident light, the area of membrane exposed and the observed yields of the reactions. For example, a three to five-fold increase in quantum yield has been observed in the photocatalytic mineralization of toxic organic contaminants using a zeolite-titania membrane, compared to the same reaction using a conventional titania-slurry. An additional two-fold increase can be obtained by doping the membrane with metal ions.

The properties of the impregnated zeolites in the membrane can influence the photoefficiency of the membrane. This is especially true when the molecular sieve-titania membrane is used in the treatment of contaminated water. The hydrophilicity of a zeolite depends on its Si/Al ratio. Lowering the ratio can make the zeolite more hydrophilic. Thus, when zeolite-titania membranes are used to mineralize organic chemicals present in water, the water molecules compete with the organic molecules for the adsorptive sites. The amount of water molecules absorbed by the impregnated zeolite will increase as the Si/Al ratio is decreased. Accordingly, silicalite, which has little aluminum, adsorbs very little water and leaves most of the adsorptive sites available for incorporating organic molecules. In contrast, ZSM-5 which has a relatively low Si/Al ratio absorbs water from the aqueous solution and leaves relatively few adsorptive sites for the organic molecules. Accordingly, the photoefficiency of a zeolite-titania membrane will increase with the increase of the Si/Al ratio.

ETS-10 is a titanium containing molecular sieve material. The synthesis and certain properties of ETS-10 are described in U.S. Pat. No. 4,853,202, the contents of which are incorporated herein by reference. ETS-10 has been determined to have a high adsorptive capability and contains titanium sites. It is thus a preferred material for use in a molecular sieve-titania membrane for mineralizing toxic organic compounds.

Molecular sieve-titania membranes can catalyze other reactions as well. For example, water can act as an electron scavenger and carbon monoxide can serve as a hole scavenger and a molecular sieve-titania membrane can catalyze the water-gas shift reaction. For example, when doped with platinum, a molecular sieve-titania membrane can catalyze the splitting of water to generate hydrogen fuel and mimic photosynthesis. It can also convert biomass such as proteins, fats and carbohydrates to $H_2$ fuels and $CO_2$.

Photocatalytic reactions involving membranes are preferred to be carried out in two types of reactors. A first type is a flow reactor, in which the reactants flow through a reaction vessel, at rates which can typically range from 0.6 ml/min/cm$^2$ to 1000 ml/min/cm$^2$, through a molecular sieve-titania membrane that is illuminated by a lamp of appropriate wavelength. Another type of reactor is known as a steady-state reactor, in which the molecular sieve-titania membrane is suspended in a stirred solution and illuminated by a lamp.

Aspects and embodiments of the invention will be explained in greater detail with reference to the following examples. These examples are presented for purposes of illustration only and are not intended to be construed in the limiting sense.

EXAMPLE 1

A molecular sieve—metal oxide membrane (silicalite-titania) was prepared by the sol gel technique using the suction method for impregnating the membrane substrate. 0.5919 g HCl (37% aqueous solution) was diluted in 35.6271 g $H_2O$. 5.6800 g of $Ti(OiPr)_4$ (obtained from the Aldrich Chemical Co. of Milwaukee, Wis.) was added to the HCl—$H_2O$ solution dropwise, with continuous stirring and a white titanium hydroxide precipitate was formed. Stirring was continued for another hour and $HNO_3$ was then added to bring the pH of the mixture down from approximately 4 to below 2. The mixture was then sonicated in an ultrasonic bath at a temperature of approximately 80° C. After approximately 1 hour of sonication, a highly dispersed and stable colloidal suspension was obtained.

One gram of silicalite having an average particle size of about 2 microns was suspended in 5 ml of $H_2O$. Silicalite is a commercial high silicon content molecular sieve, available from UOP located in Tarrytown, N.Y. Silicalite has substantially the same framework as ZSM-5, but is substantially free of aluminum.

A porous glass filter having 2 to 4 micron size pores was selected as the substrate for the membrane. The glass filter was fitted in an ordinary filtration apparatus and the silicalite suspension was drawn through the porous substrate under vacuum. Repeated applications of the silicalite suspension were performed to assure that the substrate was saturated with silicalite particles. The silicalite impregnated substrate was then dried at room temperature.

The colloidal titania suspension was allowed to percolate through the silicalite impregnated porous substrate to incorporate titania therein. The impregnated substrate was dried at room temperature and fired at a temperature of 400° C. with a heating rate of about 1° C./min to produce a silicalite-titania membrane in accordance with the invention.

EXAMPLE 2

ZSM-5 having a Si:Al ratio of about 25:1 was prepared as outlined in U.S. Pat. No. 3,702,886. It was characterized by x-ray diffraction, atomic absorption and hexane adsorption. 0.5 g of the ZSM-5 zeolite material was suspended in 2.5 ml of $H_2O$ and a ZSM-5-titania membrane was formed by the same procedure and with the same titania suspension described in Example 1.

EXAMPLE 3

Another membrane in accordance with the invention was prepared by following the procedure of Example 1, except that NaA, a commercially available low silicon zeolite material obtained from the Aldrich Chemical Company was used instead of silicalite.

EXAMPLE 4

Another membrane in accordance with the invention was prepared as set forth in Example 1, except that ETS-10, a titanium containing molecular sieve available from the Englehard Company was used in place of silicalite.

EXAMPLE 5

A $Cu^{2+}$ ion doped zeolite-titania membrane was prepared as follows.

Zeolite powder was embedded in a porous substrate as described in Example 1. $CuSO_4.5H_2O$ (0.3143 g) was dissolved in 35.6271 g of $H_2O$. 0.5919 g of HCl (37% solution) was mixed with the aqueous copper sulfate solution and 5.6800 g of $Ti(OiPr)_4$ was added dropwise to the mixture, with continuous stirring. The mixture was stirred for another hour and $HNO_3$ was used to peptize the titania hydroxide precipitate which formed. The mixture was subjected to sonication at approximately 80° and a $Cu^{2+}$ containing titania colloidal suspension was obtained. A membrane was prepared from this suspension by the same procedure as in Example 1 to yield a 5% $Cu^{2+}$ doped zeolite-titania membrane.

EXAMPLES 6-10

The adsorptive properties of the zeolite-titania membranes prepared in Examples 1, 2 and 4 were evaluated in Examples 6, 7 and 8, respectively with two comparison membranes (Examples 9 and 10) by the procedure described in Landolt, G. R. *Analytical Chem.* Vol. 43, p. 613 (1971). The titania membrane was prepared as in. Example 1, except that the porous substrate was not impregnated with zeolite.

The zeolite-titania membranes prepared from Examples 1, 2 and 4, corresponding to Examples 6, 7 and 8, respectively and the comparison membranes of Examples 9 and 10 were calcined at 550° C. for 12 hours. Hexane vapor was exposed to the calcined membranes at a pressure of approximately 20 mm Hg for an exposure time of 1 hour. The amount of hexane adsorbed by the membrane was determined by the weight change of the membrane and the hexane adsorption value is expressed as the percent weight of hexane adsorbed based on the initial weight of the adsorbent. The results are listed below in Table 1.

TABLE 1

Adsorption of Hexane on Zeolite-Titania Membranes

| | SAMPLE | HEXANE ADSORPTION |
|---|---|---|
| Example 6 | silicalite-titania membrane (Ex. 1) | 5.2% |
| Example 7 | ZSM-5 titania membrane (Ex. 2) | 4.6% |
| Example 8 | ETS-10-titania membrane (Ex. 4) | 4.8% |
| Example 9 | titania membrane (Comparison) | 2.1% |
| Example 10 | porous substrate (Comparison) | 2.1% |

As shown in Table 1, the membranes constructed in accordance with the invention exhibited superior hexane adsorption compared to the comparison membranes. The difference in adsorption between molecular sieve-titania membranes and the titania membrane is due to the presence of the impregnated zeolite in the membrane. Thus, the extra weight percent of hexane adsorbed on the membrane is 3.1% for the impregnated silicalite membrane, 2.7% for the impregnated ETS-10 membrane and 2.5% for the impregnated ZSM-5 membrane. Accordingly, the impregnated zeolites increase the adsorptive properties of the membrane and can therefore increase the catalytic activity of the membrane.

EXAMPLES 11-13

The ion exchange properties of an NaA-titania membrane prepared as in Example 3 were compared with those of a membrane of Example 9, which did not include zeolite material. Both membranes were suspended in a stirred 10 ppm $Fe^{2+}$ solution and the results of the ion exchange study are presented below in Table 2.

TABLE 2

Ion Exchange Studies of NaA-Titanium Membranes

| | Sample | Time | % of Exchange |
|---|---|---|---|
| Example 11 | NaA-titania membrane | 1 hour | 30% |
| Example 12 | NaA-titania membrane | 3 hours | 33% |
| Example 13 | titania membrane | 1 hour | 0% |

As shown in Table 2, an NaA-titania membrane has superior ion exchange capacity compared to a titania membrane that does not include molecular sieve material.

EXAMPLE 14

A silicalite-titania membrane was prepared as follows using the sol gel technique and dip coating method. A titania sol was prepared as in Example 1. Silicalite particles were then Suspended in the prepared sol to a concentration of 0.2 g of silicalite per gram of sol. A porous glass filter substrate having a pore size of about 2–4 microns was dipped into the silicalite-titania suspension and then drawn out slowly. The silicalite-titania membrane was then prepared by drying and firing.

EXAMPLE 15

A silicalite-titania membrane was prepared as follows using the sol gel technique and surface reaction method. A suspension was prepared of 0.2 g of silicalite per ml of $H_2O$. A porous substrate was soaked in 0.8M HCl for 15 minutes and then allowed to dry in the air. Silicalite was impregnated in the HCl-treated porous substrate by the method described in Example 1. The silicalite-impregnated and HCl treated substrate was dipped into a $Ti(OiPr)_4$ isopropanol solution prepared by combining 2.84 g of Ti(OiPr)$_4$ with 12 g of anhydrous isopropanol. The substrate was removed after one hour, allowed to dry and fired to yield a silicalite-titania membrane.

EXAMPLE 16

A silicalite-titania membrane was prepared using the sol gel technique and surface reaction method. A silicalite-impregnated substrate was prepared as in Example 15. The substrate was then suspended in a closed jar containing 10 ml of titania isopropoxide and the jar was heated in an oil bath to a temperature of 120° for ten minutes. The titanium isopropoxide of vapor inside the jar reacted with the substrate and formed a thin film of titania on the silicalite-impregnated substrate to yield a silicalite-titania membrane.

EXAMPLE 17

A silicalite-titania membrane was prepared using the sol gel technique and suction method as follows. Silicalite was suspended in an anhydrous isopropanol and then impregnated in a porous substrate as in Example 1. 1.2895 g of H$_2$O was combined with 0.1754 g HCl (37% aqueous solution) and diluted in 16.6667 g of anhydrous isopropanol. 6.3111 g of Ti(OiPr)$_4$ was added to the 16.6667 g of anhydrous isopropanol and the H$_2$O/HCl/iPrOH solution was added slowly to the Ti(OiPr)$_4$ isopropanol solution while stirred with a magnetic stirrer. A titania sol was obtained and a silicalite-titania membrane was formed using the sol as in Example 1.

EXAMPLE 18

A silicalite-titania-silica hybrid membrane was prepared using the sol gel technique and suction method as follows. A silicalite-impregnated substrate was prepared as in Example 1. 0.4903 g H$_2$O and 0.0789 g HCl (37% aqueous solution) were diluted in 9.000 g of anhydrous isopropanol. 2.5560 g of titanium tetraisopropoxide and 0.2080 g of silicon tetraethoxide were added to 9.0000 g of anhydrous isopropanol. The H$_2$O—HCl—iPrOH solution was added slowly to the Ti(OiPr)$_4$—Si(OEt)$_4$-isopropanol solution with a magnetic stirrer to yield a titania-silica hybrid sol. A silicalite-titania-silica hybrid membrane was formed using the sol and the method of Example 1.

EXAMPLE 19

A silicalite-titania-silica hybrid membrane was prepared using the sol gel technique and suction method as follows. A silicalite substrate was impregnated as in Example 1. 0.7892 g of 37% aqueous solution HCl was diluted in 31.0028 g of H$_2$O and a mixture of 2.5560 g of Ti(OiPr)$_4$ and 0.2080 g of Si(OEt)$_4$ was added to the HCl—H$_2$O solution drop wise with continuous stirring. A white hybrid titanium-silicon hydroxide precipitate was formed and the mixture was stirred for an additional hour. HNO$_3$ was then added to the above mixture to bring the pH down from approximately 4 to below 2. Thereafter the mixture was sonicated in a supersonic bath at approximately 80° C. After approximately one hour of sonication, a highly dispersed, stable titania-silica hybrid colloidal suspension was obtained. A silicalite-titania-silica hybrid membrane was formed using the sol as in Example 1.

EXAMPLE 20 (FOR COMPARISON)

10 mg of TCE was dissolved in one liter of water. A TiO$_2$ slurry was prepared for mineralizing the TCE solution at a concentration of 2 g/L. The TCE solution was combined with the slurry and photocatalysis was carried out for one hour. The results are summarized below in Table 3.

EXAMPLE 21

The ten ppm aqueous solution of Example 20 was mineralized by photocatalysis with the silicalite-titania membrane of Example 1 as follows. Photocatalysis was carried out in a flow reactor for one hour. A single pass operation was carried out at a flow rate of 10 ml/min/cm$^2$ and the results are summarized below in Table 3.

TABLE 3

Mineralization of 10 ppm TCE solution

| | Condition | TCE Conversion |
|---|---|---|
| Example 20 | TiO$_2$ slurry | 5% |
| Example 22 | silicalite-titania membrane | 51% |

The mineralization of TCE produces chloride ions which were detected using a chloride selective electrode. As shown in Table 3, the photomineralization efficiency of the silicalite-titania membrane is much higher than the TiO$_2$ slurry under the same experimental conditions. Accordingly, silicalite-titania membranes of the invention can be superior to TiO$_2$ slurries at mineralizing toxic organic chemicals.

EXAMPLES 22 AND 23

A 10 ppm benzene aqueous solution was mineralized by the silicalite-titania membrane of Example 1 as follows. A 10 ppm benzene solution was prepared by dissolving 10 mg of benzene in 1 liter of water. Photocatalysis was carried out in a flow reactor with a flow rate of 10 ml/min/cm$^2$. The membrane was illuminated by a lamp emitting radiation having a peak at 365 nm and a peak intensity at 32 mW/cm$^2$ at 3.5 inches. The distance between the lamp the membrane was 3.5 inches and the results are summarized in Table 4. Example 22 represents a single pass operation and Example 23 represents a recycle operation.

TABLE 4

Mineralization of 10 ppm Benzene

| | Condition | Benzene conversion |
|---|---|---|
| Example 22 | single-pass, 1 hour | 61% |
| Example 23 | recycled, 12 hours | 83% |

The mineralization of benzene in Examples 22 and 23 produced CO$_2$, which was trapped by Ba(OH)$_2$ to form BaCO$_3$ precipitate. The percentage conversion of benzene was calculated from the weight of BaCO$_3$ precipitate formed. Examples 22 and 23 show that benzene can be mineralized to carbon dioxide in the presence of a silicalite-titania membrane illuminated by ultraviolet radiation. Using these data and the 1.3 cm$^2$ area of the membrane, the photoefficiency can be estimated to be about 5–6%. This is 2–3 times that of a typical slurry value of about 2%.

EXAMPLES 24–26

Examples 24–26 compare the photocatalytic efficiency of the zeolite-titania membranes of Examples 1 and 2 with a titania membrane and show the effect on photoefficiency of changing the Si:Al ratios of the impregnated zeolites. In Examples 24–26, 100 ml of a 10 ppm TCE solution was mineralized in a steady state reactor for one hour. The distance between the lamp and the membrane was 2.5 inches and the results are summarized in Table 5.

The membrane of Example 24 was prepared as in Example 1; the membrane of Example 25 was prepared as in Example 2 and the titania membrane was prepared as in Example 1 except that the porous substrate was not impregnated with silicalite. The membranes were fired at 100° C. for twelve hours.

TABLE 5

Comparison of zeolite-titania membrane and titania membrane alone in mineralizing 10 ppm TCE

| Sample | | Amount of Zeolite | TCE conversion |
|---|---|---|---|
| Example 24 | silicalite-titania (Ex. 1) | 40 mg | 30% |
| Example 25 | ZSM-5 titania (Ex. 2) | 50 mg | 20% |
| Example 26 | titania | 0 mg | 12% |

As shown in Table 5, a three fold increase in TCE conversion was observed for the silicalite-titania membrane, compared to the titania membrane. Accordingly, the inclusion of silicalite plays an important role in the photoefficiency of the mineralization process.

The Si:Al ratio of silicalite is approximately 1200:1; whereas the ZSM-5 of Example 25 had an Si:Al ratio of about 25:1. Accordingly, the Si:Al ratio has a significant effect on the photomineralization efficiencies of zeolite/titania membranes. Examples 24 and 25 show that zeolites with a higher Si:Al ratio provide superior quantum yield, although ZSM-5, with a high aluminum content is still significantly superior to the titania membrane without impregnated zeolite.

EXAMPLES 27–30

The effect of the weight percentage of $Cu^{2+}$ on the mineralization of TCE with a silicalite-titania membrane was examined. Three silicalite-titania membranes were prepared as in Example 5. Example 30 corresponds to Example 5 in which the percent of $Cu^{2+}$ was 5.0. Example 29 included 0.1884 g of $CuSO_4 \cdot 5H_2O$ to yield a weight percent of 3.0 and Example 28 included 0.0314 g of $CuSO_4 \cdot 5H_2O$ to yield a weight percent of 0.5. Example 27 Was prepared as in Example 1 and did not include $Cu^{2+}$. The membranes were fired at 100° C. for twelve hours. Photolysis of a 100 mL solution of 20 ppm TCE was carried out in a steady state reactor for one hour and the distance between the lamp and the membrane was 2.5 inches. The photomineralization results are summarized below in Table 6.

TABLE 6

Mineralization of 20 ppm TCE using $Cu^{2+}$ doped silicalite-titania membranes

| | Wt % of $Cu^{2+}$ | TCE conversion |
|---|---|---|
| Example 27 | 0.0 (Ex. 1) | 46% |
| Example 28 | 0.5 | 65% |
| Example 29 | 3.0 | 90% |
| Example 30 | 5.0 (Ex. 4) | 99% |

Table 6 shows that doping the silicalite-titania membrane with $Cu^{2+}$ ions results in a marked increase in the photocatalytic efficiency of the membrane and the efficiency increases with increased $Cu^{2+}$ doping level.

EXAMPLES 31–32

An ETS-10-titania membrane was prepared as in Example 3 used to mineralize a 20 ppm TCE solution in a steady state reactor in which photolysis was carried out for one hour. The distance between the lamp and the membrane was 2.5 inches. Example 31 corresponds to a membrane including 20 mg of ETS-10 and Example 32 Corresponds to the use of 155 mg of ETS-10. As shown below in Table 6, increasing the amount of molecular sieve can increase the percentage yield. It is estimated that the photoefficiency for an ETS-10-titania membrane is about 2.5 times that of a titania-only membrane.

TABLE 7

Mineralization of 20 ppm TCE using a ETS-10-titania membrane

| | Weight of ETS-10 | TCE conversion |
|---|---|---|
| Example 31 | 20 mg | 51% |
| Example 32 | 155 mg | >99% |

EXAMPLES 33–34

Examples 33–34 demonstrate the photomineralization of a mixture of toxic organic chemicals in the presence of a silicalite-titania membrane doped with 5% $Cu^{2+}$ (Example 34) and without $Cu^{2+}$ ions (Example 33).

A mixture of 50 ppm TCE, 50 ppm chloroform and 50 ppm benzene was mineralized in a steady state reactor. Photolysis was conducted for one hour and the distance between the lamp and the membrane was 2.5 inches. The results are shown below in Table 7 and demonstrate that silicalite-titania membranes can mineralize a mixture of toxic organic chemicals and that doping the membrane with $Cu^{2+}$ ions can increase the photoefficiency.

TABLE 8

Mineralization of a mixture of 50 ppm TCE, 50 ppm chloroform and 50 ppm benzene

| | | Percent conversion | |
|---|---|---|---|
| | Sample | TCE and Chloroform | Benzene |
| Example 33 | silicalite-titania | 25% | 60% |
| Example 34 | $Cu^{2+}$-silicalite-titania | 35% | 76% |

EXAMPLES 35–36

Certain inorganic cations, such as $Fe^{2+}$ can foul conventional titania photocatalyst by adsorbing light or reacting with the catalyst surface. Examples 35 and 36 demonstrate the photomineralization of a mixture of a toxic organic chemicals in the presence of silicalite-titania membranes in which $Fe^{2+}$ ions are present in the solution. A mixture was prepared including 50 ppm TCE, 50 ppm chloroform and 50 ppm benzene as well a 50 ppm $Fe^{2+}$ ions. As shown below in Table 9, the efficiencies are substantially the same as those found in Examples 33 and 34 shown in Table 8. Accordingly, the zeolite-titania catalyst system of the invention was not fouled by inorganic ions.

TABLE 9

Mineralization of a mixture of 50 ppm TCE, 50 ppm chloroform, and 50 ppm benzene in the presence of 50 ppm $Fe^{2+}$

| Sample | Percent conversion | |
|---|---|---|
| | TCE and Chloroform | Benzene |
| Example 35 silicalite-titania | 25% | 70% |
| Example 36 $Cu^{2+}$-silicalite-titania | 32% | 70% |

EXAMPLE 37

Example 37 demonstrates that toxic organic chemicals trapped in the impregnated zeolite of the zeolite-titania membrane can be mineralized by the titania matrix of the membrane as follows. 20% by weight TCE was loaded on silicalite. Titanium dioxide ($TiO_2$) was mixed with the TCE loaded silicalite in a 1:1 weight ratio. The $TiO_2$/TCE loaded silicalite mixture was photolyzed under near ultraviolet light in a fluidized bed. After one hour of photolysis, a 25% conversion of TCE was determined by a chloride selective electrode. This shows that toxic organic chemicals trapped in the impregnated zeolite on a zeolite-titania membrane can be mineralized by the titania matrix of the membrane and confirms the important role played by the zeolite material in the mineralization process.

EXAMPLES 38

A 20 ppm TCE solution was passed through a silicalite-titania membrane at 10 ml/min/$cm^2$ for 1 hour without irradiation. The resultant solution contained 11.7 ppm TCE. Accordingly, the molecular sieve-titania membrane is able to separate organic chemicals from a water solution.

EXAMPLES 39-41

Membranes were prepared in Example 5 except that the porous substrate was not impregnated with zeolite material. The membranes were fired at 100° C. for 12 hours. A 20 ppm TCE solution was photolyzed in a steady-state reactor of 100 ml total volume for 1 hour and the results are summarized in Table 10.

TABLE 10

Effect of $Cu^{2+}$ doping ions on TCE photomineralization in titania membranes

| | Percent of $Cu^{2+}$ ion | TCE Conversion |
|---|---|---|
| Example 39 | 0% | 7% |
| Example 40 | 3% | 33% |
| Example 41 | 5% | 44% |

The results demonstrate the important effect of $Cu^{2+}$ doping ions in the absence of zeolites. Comparing these results to those of Examples 27-30 show that $Cu^{2+}$ ions enhance the photoefficiency of molecular sieve-titania membranes without the effect of the molecular sieve.

It will thus be seen that the objects set forth above, among those made apparent from the preceding description are efficiently attained and, since certain changes can be made in carrying out the above method and in the constructions set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of conducting a chemical reaction comprising:

providing a membrane comprising an inert porous supporting substrate, wherein both semiconductor material and molecular sieve material are bonded to the substrate substantially within the pores of the substrate; directing light onto the substrate having the semiconductor material and molecular sieve material therein; contacting a quantity of reactant material with the semiconductor material and molecular sieve material to the substrate while the substrate is being illuminated with the light; and changing the composition of the reactant to a product of different composition than the reactant.

2. The method of claim 1, comprising illuminating the membrane with electromagnetic radiation.

3. The method of claim 2, wherein the radiation has a wavelength between about 200 and 800 nm.

4. The membrane of claim 1, wherein the molecular sieve material is zeolite material.

5. The membrane of claim 1, wherein the semiconductor material includes titania material.

6. The method of claim 1, wherein the reactant stream comprises organic compounds which are photo-oxidized at the membrane.

7. The method of claim 1, wherein the reactant stream comprises water and the water is decomposed to hydrogen and oxygen at the membrane.

8. The method of claim 1, wherein the reactant comprises CO and $H_2O$ which is reacted at the membrane to yield $CO_2$ and $H_2$.

9. The method of claim 1, wherein the reactant comprising methane, ammonia and water which is reacted at the membrane to yield amino acids.

10. The method of claim 1, wherein the membrane comprises zeolite material and titania material and the reactant comprises organic chemicals which become trapped in the zeolite portion of the membrane and are mineralized by the titania portion of the membrane.

11. The method of claim 1, wherein the reaction is conducted as a flow through reaction.

12. The method of claim 1, wherein the reaction is carried out in a steady-state reactor.

13. The method of claim 1, comprises the step of combining metal ions with the membrane.

14. The method of claim 1, including the step of combining $Cu^{2+}$ ions with the membrane.

15. A membrane for affecting the composition of material coming in contact with the membrane, comprising an inert porous substrate having pores with a diameter of about 2.5 to 50 microns defined by pore wall, wherein molecular sieve material and photoactive semiconductor material doped with metal ions area bonded to the pore walls of the substrate.

16. The membrane of claim 15, wherein the semiconductor material comprises $TiO_2$.

17. The membrane of claim 16, wherein the metal ions comprises $Cu^{2+}$ ions.

18. The membrane of claim 17, wherein the semiconductor is supported on an inert porous substrate.

* * * * *